US012722882B2

(12) United States Patent
Cabrera et al.

(10) Patent No.: US 12,722,882 B2
(45) Date of Patent: Sep. 1, 2026

(54) DEVICE FOR STORING USED OIL, GREASE AND FAT

(71) Applicant: CKG Innovations, East Islip, NY (US)

(72) Inventors: Alexander John Cabrera, East Islip, NY (US); William Guillermo Gonzalez, Bronx, NY (US); Alexander Paul Knobloch, New Paltz, NY (US)

(73) Assignee: CKG Innovations, East Islip, NY (US)

( * ) Notice: Subject to any disclaimer, the term of this patent is extended or adjusted under 35 U.S.C. 154(b) by 0 days.

(21) Appl. No.: 18/963,151

(22) Filed: Nov. 27, 2024

(65) Prior Publication Data

US 2025/0171224 A1 May 29, 2025

Related U.S. Application Data

(60) Provisional application No. 63/712,204, filed on Oct. 25, 2024, provisional application No. 63/603,898, filed on Nov. 29, 2023.

(51) Int. Cl.

| | |
|---|---|
| ***B65F 1/06*** | (2006.01) |
| ***B65D 30/08*** | (2006.01) |
| ***B65D 33/30*** | (2006.01) |
| ***B65D 53/02*** | (2006.01) |
| *B65D 25/28* | (2006.01) |
| *B65F 1/00* | (2006.01) |

(52) U.S. Cl.

CPC ................ *B65F 1/06* (2013.01); *B65D 31/02* (2013.01); *B65D 33/30* (2013.01); *B65D 53/02* (2013.01); *B65D 25/2811* (2013.01); *B65F 1/0026* (2013.01); *B65F 2210/1023* (2013.01); *B65F 2240/142* (2013.01); *B65F 2240/152* (2013.01); *B65F 2250/105* (2013.01)

(58) Field of Classification Search

CPC .................... B65F 2240/152; B65F 2240/142
USPC ........................................................ 206/524.4
See application file for complete search history.

(56) References Cited

U.S. PATENT DOCUMENTS

| | | | | | |
|---|---|---|---|---|---|
| 3,184,100 | A * | 5/1965 | Thomas | B65F 1/06 220/8 |
| 3,487,439 | A * | 12/1969 | Winston | A47J 37/1271 206/524.1 |
| 4,555,339 | A * | 11/1985 | Graves | B01D 29/01 210/244 |

(Continued)

FOREIGN PATENT DOCUMENTS

| | | | | |
|---|---|---|---|---|
| GB | 2401850 | A * | 11/2004 | F16N 31/00 |

OTHER PUBLICATIONS

“Fry Away Pan Fry Cooking Oil Solidifier,” found: https://www.amazon.com/FryAway-Solidifier-Plant-Based Disposal . . . 6 pages.

(Continued)

*Primary Examiner* — Mollie Impink
(74) *Attorney, Agent, or Firm* — Saile Ackerman LLC; Stephen B Ackerman

(57) ABSTRACT

A device for storing used oil, grease, and fat is disclosed. A disposable bag, holding the used oil, grease, and fat, also contains a plant-based solidifying blend in tablet or paste form. A heat-resistant container holds the bag, and includes a lid to prevent spills, a handle, and slots, used to secure the bag along with its contents. The solidifying blend causes the oil to solidify after coming into contact with the oil.

19 Claims, 9 Drawing Sheets

(56) References Cited

U.S. PATENT DOCUMENTS

| | | | | | |
|---|---|---|---|---|---|
| 5,322,196 | A * | 6/1994 | Burton | A47J 36/14 210/244 |
| 5,908,377 | A * | 6/1999 | Fukuda | B01J 19/06 516/108 |
| 6,365,214 | B1 * | 4/2002 | Kirk | C11B 13/00 426/422 |
| 8,206,761 | B2 * | 6/2012 | Kutumian | A01N 65/28 424/405 |
| 9,192,265 | B1 | 11/2015 | Johnson | |
| 9,856,636 | B2 * | 1/2018 | Santos | C02F 1/40 |
| 11,339,341 | B1 * | 5/2022 | McCarthy | C10L 5/365 |
| 11,358,886 | B2 * | 6/2022 | Elliott | C02F 11/008 |
| 2017/0094995 | A1 | 4/2017 | Eskamani et al. | |
| 2022/0408750 | A1 | 12/2022 | Gransberry et al. | |

OTHER PUBLICATIONS

"Grease Daddy Plus—36 oz/5 Pack," found: https://www.amazon.sg/Grease-Daddy-Plus-Pack-Seen/dp/B07MD6R4KK 4 pages.

"Hard Oil," found: https://www.amazon.com/Cooking-Solidifier-Hardener-Power-Solid . . . , 6 pages.

* cited by examiner

DEVICE FOR STORING USED OIL, GREASE AND FAT

This application claims the benefit of U.S. Provisional Patent Application Ser. No. 63/603,898, (AB23-001(PR)), filed on Nov. 29, 2023, assigned to the same assignee as the present invention, and incorporated herein by reference in its entirety, and U.S. Provisional Patent Application Ser. No. 63/712,204, (AB23-002(PR)), filed on Oct. 25, 2024, assigned to the same assignee as the present invention, and incorporated herein by reference in its entirety.

BACKGROUND

Field

The present disclosure relates generally to storing used cooking oil, grease, and fat, and more specifically storing them in a disposable bag housed in a secured container

Background

Used edible cooking oil is currently stored in make-shift containers originally designed for other purposes, or simply poured down the drain or into garbage bags. When these improvised containers are discarded, the material and unsecured oil negatively impact the environment. Home cooks who pour used oil down the drain often are unaware of the damage done to pipes, which leads to clogged drains and countless plumbing bills. Pouring these excess oils, greases, and fats down the drain, toilet or outside end up contaminating water systems and sources. When pouring these materials down a drain, the oils, greases, and fats lead to developing "fatbergs" that may lead to extremely costly plumbing repairs. The oils, greases and fats that enter water bodies this way may form a surface film in the water, blocking oxygen and sunlight, harming aquatic life by impeding plant growth and endangering aquatic creatures. Additionally, the practice of pouring the used cooking oil into the rest of one's garbage is the most dangerous because this action is a leading factor in grease fires.

SUMMARY

Accordingly, it is an object of one or more embodiments of the present disclosure to provide a disposable bag into which used oil, grease, and fat is poured, and a plant-based solidifying blend is placed, causing the oil, grease, and fat to solidify.

It is a further object of one or more embodiments of the disclosure to provide a container, with a handle, lid, and slots, configured to hold the disposable bag.

It is a further object of one or more embodiments of the disclosure for the plant-based solidifier blend to oversaturate used oil, grease, and fat with hydrogen, increasing the melting point, resulting in the oil, grease, and fat being a solid at room temperature, making it much more manageable to contain.

Other objects will appear hereinafter.

The above and other objects of the present disclosure may be accomplished with a device for storing used oil, grease, and fat. The device includes a disposable bag, where used oil grease, and fat is poured, and into which a plant-based solidifying blend is placed. The device also includes a container, including a handle, lid, and slots, configured to hold the bag that fits inside the container. The plant-based solidifying blend causes the oil, grease, and fat to solidify after coming into contact with one another.

The objects of the disclosure are further achieved by the plant-based solidifying blend comprising a tablet or flakes placed inside, or a paste or spray on material placed on the inner lining, of the bag.

The object of this disclosure includes its variants, and its alternative embodiments, independently of its applications or processes it may be applied to.

BRIEF DESCRIPTION OF THE DRAWINGS

The present disclosure will be more clearly understood from the following description taken in conjunction with the accompanying drawings in which like reference numerals designate similar or corresponding elements, regions, and portions and in which.

DETAILED DESCRIPTION

A device for holding solidified oils, greases, and fats is disclosed. The device comprises a disposable bag fitted inside a heat resistant container, where the bag holds used oil, grease, and fat, as it is poured into it. The bag is designed to fit inside the container and may include a bulb at its bottom, which fits inside the container, to help keep the bag in place during use. An airtight cover is attached to the top of the container to prevent spills. A solidifying agent, in tablet or flake or spray on material or paste form, is placed inside the bag, causing the used oil, grease, and fat to solidify. The container design comprises two slots for a tin tie to rest in, and to hold the bag securely. The disclosure described herein provides a safe, convenient way to dispose of used cooking oil.

The key features of the design include a plant-based solidifying blend placed inside the bag or on its inner lining. The heat-resistant container includes a main container and a cover, preferably made from recycled PET plastic. A flared container top is used to better funnel liquids into the container. A simple thread on/off sealing process is implemented with the airtight cover and includes an extended bottom portion that dips into the main container when fully on, to prevent internal spillage. The dual layered bag may be made from jute burlap and wax/parchment paper stitched together with thread. At the top of the bag, a tin-tie may be stitched or glued, for closing and securing the contents of the bag. Other methods of attaching the jute burlap to the wax/parchment include an adhesive spray/gel such as a water based adhesive spray, beeswax, or gum rosin, or a non-toxic adhesive such as a non-toxic glue. Other materials for the bag construction include natural fibers such as bamboo or hemp, or grease paper, sticky on one side and non-sticky on the other, with a thickness of, for example, at least 30 GSM. Other methods of closing the bag include cloth drawstrings.

Materials for the plant-based solidifying agent may comprise stearic acid and oleic acid in a 4:1 ratio. The materials may also include, for example, 4 tablespoons of stearic acid, 2 tablespoons of oleic acid, and 1 tablespoon of beeswax, where the beeswax adds elasticity, a paste-like texture, malleability, and a pleasant scent to the bag and its contents.

Figure 1A:
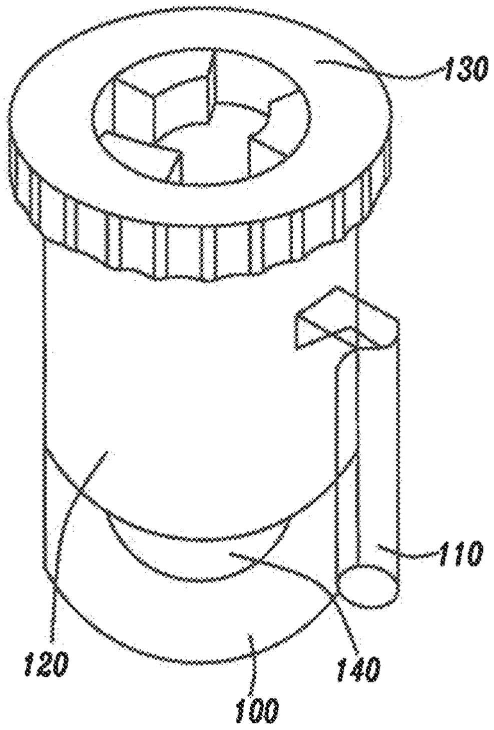
FIG. 1A illustrates a container, handle, and lid in a first preferred embodiment of the present disclosure, in a perspective view.

FIG. 1A illustrates, in a perspective view, container 100, handle 110, and lid 130, in a first preferred embodiment of the present disclosure.

Figure 1B:
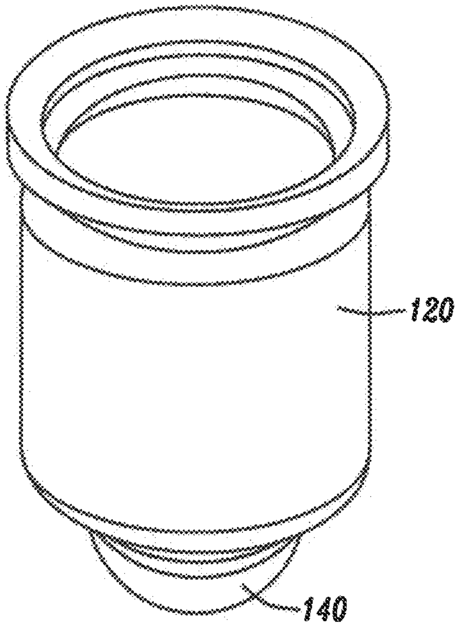
FIG. 1B shows a bag, into which used oil is poured, in the first preferred embodiment of the present disclosure.

FIG. 1B shows, in a perspective view, bag 120, into which the used oil is poured. The bag is designed to fit inside the container, including bulb 140 at its bottom, to help keep the bag in place during use.

Figure 1C:
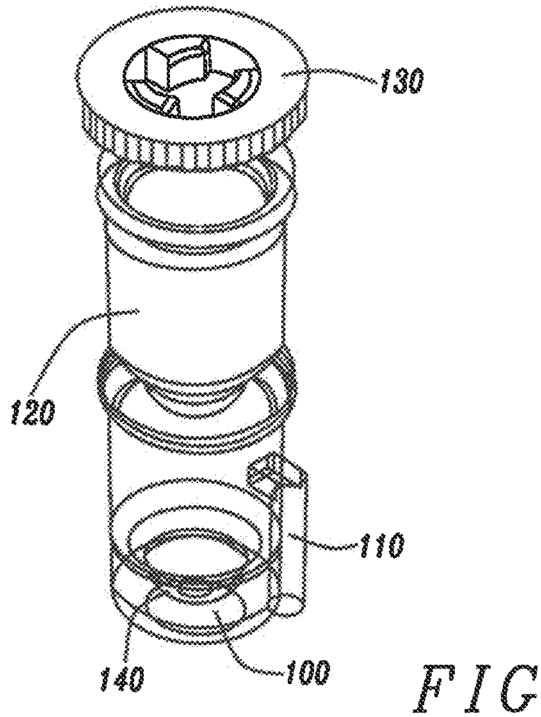
FIG. 1C illustrates how the bag of the disclosure fits inside the container, which is covered with a lid attached to its top, in a perspective view.

FIG. 1C illustrates, in a perspective view, bag 120 fitting inside container 100, which is covered with lid 130, that attaches to the top of the container.

The main container is preferably made of 100% recycled polyethylene (rPET) plastic to ensure it does not negatively impact the environment. rPet is a food-safe raw material made from empty PET packaging that has been collected and prepared for recycling. rPET has on average a melting point of 243 degrees Celsius and can withstand high temperatures. It is commonly used for food containers with the anticipation for storing hot and cold foods and is one of the best plastics regarding stability over a wide range of temperatures. Other possible container materials include carbon, chosen for its heat-resilient properties and carbon negative emissions.

Figure 2A:
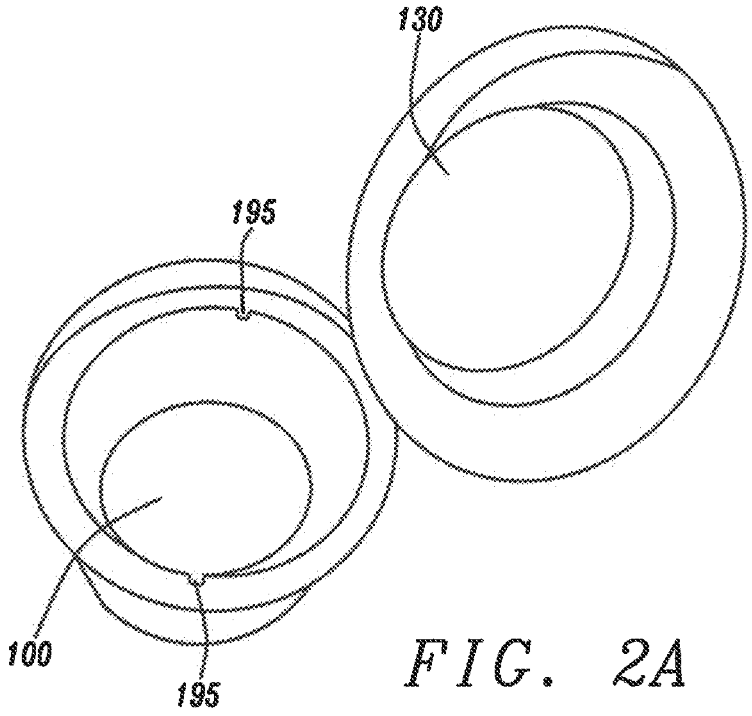
FIG. 2A shows the container with the lid screwed off, in a view from the top, for a second preferred embodiment.
Figure 2B:
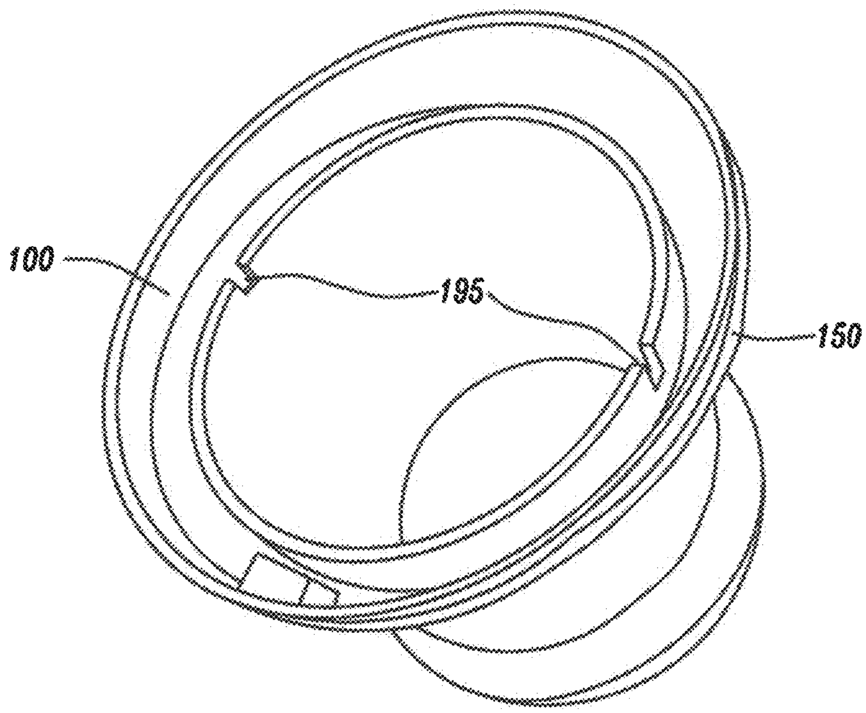
FIG. 2B illustrates the container without the lid, in a view from the top, for the second preferred embodiment.
Figure 2C:
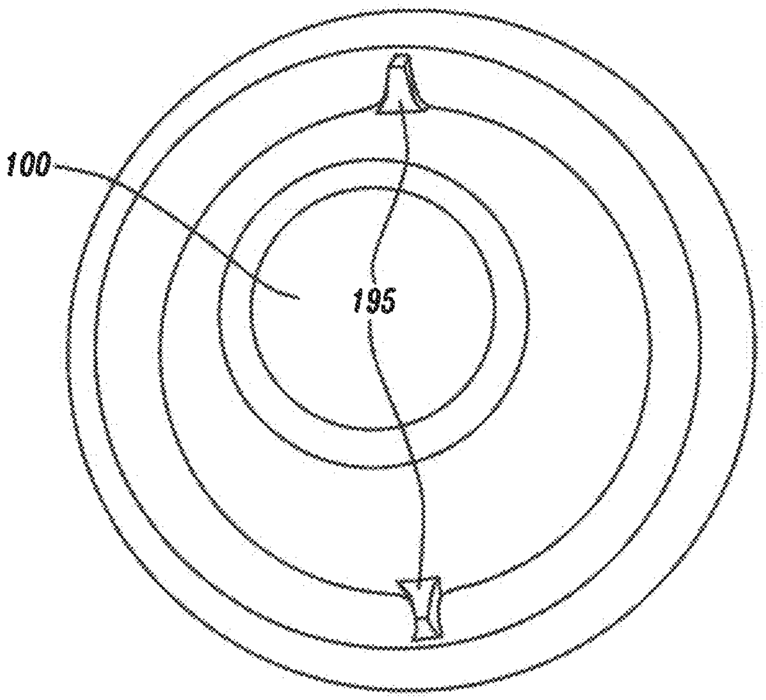
FIG. 2C illustrates the container without the lid, in a view from the top, showing two slots, in the second preferred embodiment.

FIGS. 2A, 2B, and 2C depict a second preferred embodiment, showing the container 100 with the lid 130 screwed off, from a top view. The container has an airtight, threaded top 150 onto which the lid is screwed, to help prevent the escape of unwanted odors from the used oil, grease, and fat inside the container. The lid is configured with an extended bottom portion that dips into the container when the lid is fully attached and may include an O-ring for an airtight seal. The container design includes slots 195 for a tin tie to rest in and hold the bag securely.

Figure 2D:
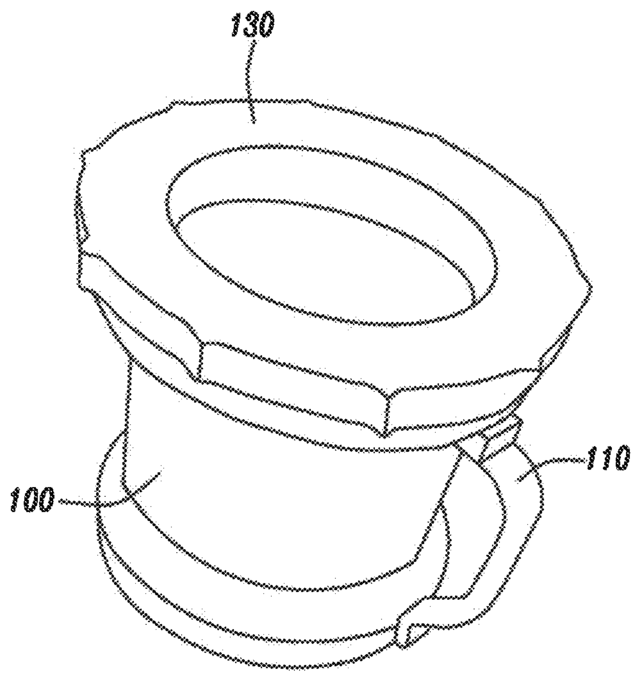
FIG. 2D shows the container with the lid screwed on, in a perspective view, for the second preferred embodiment.
Figure 2E:
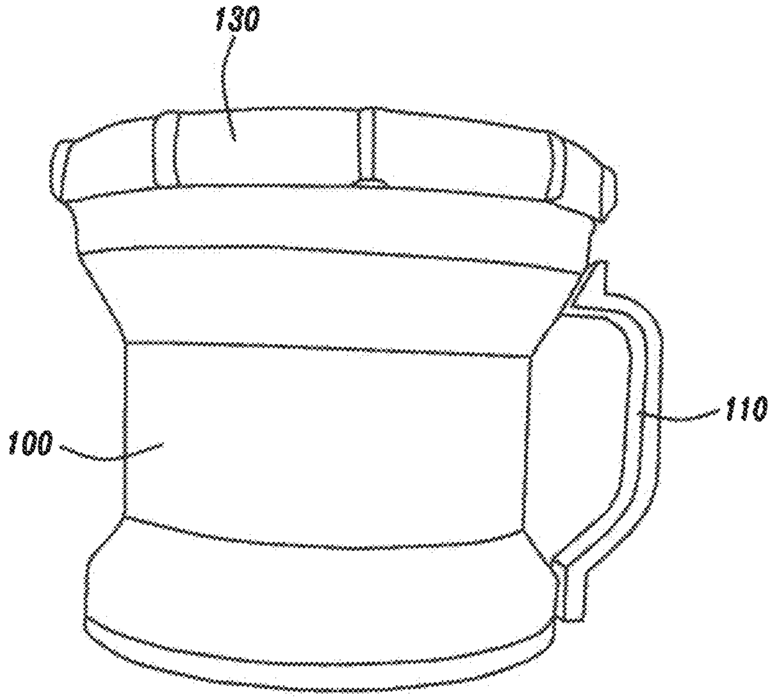
FIG. 2E illustrates the container with the lid screwed on, from the side, for the second preferred embodiment.

FIGS. 2D and 2E illustrate the container 100 with the lid 130 screwed on, from the top and the side, for the second preferred embodiment. The container has a strong ergonomic handle 110, with a mug like design. The materials used in the construction can withstand high temperatures allowing a consumer to immediately pour hot used oil into the bag held by the container, eliminating wait time for cleanup.

Figure 3A:
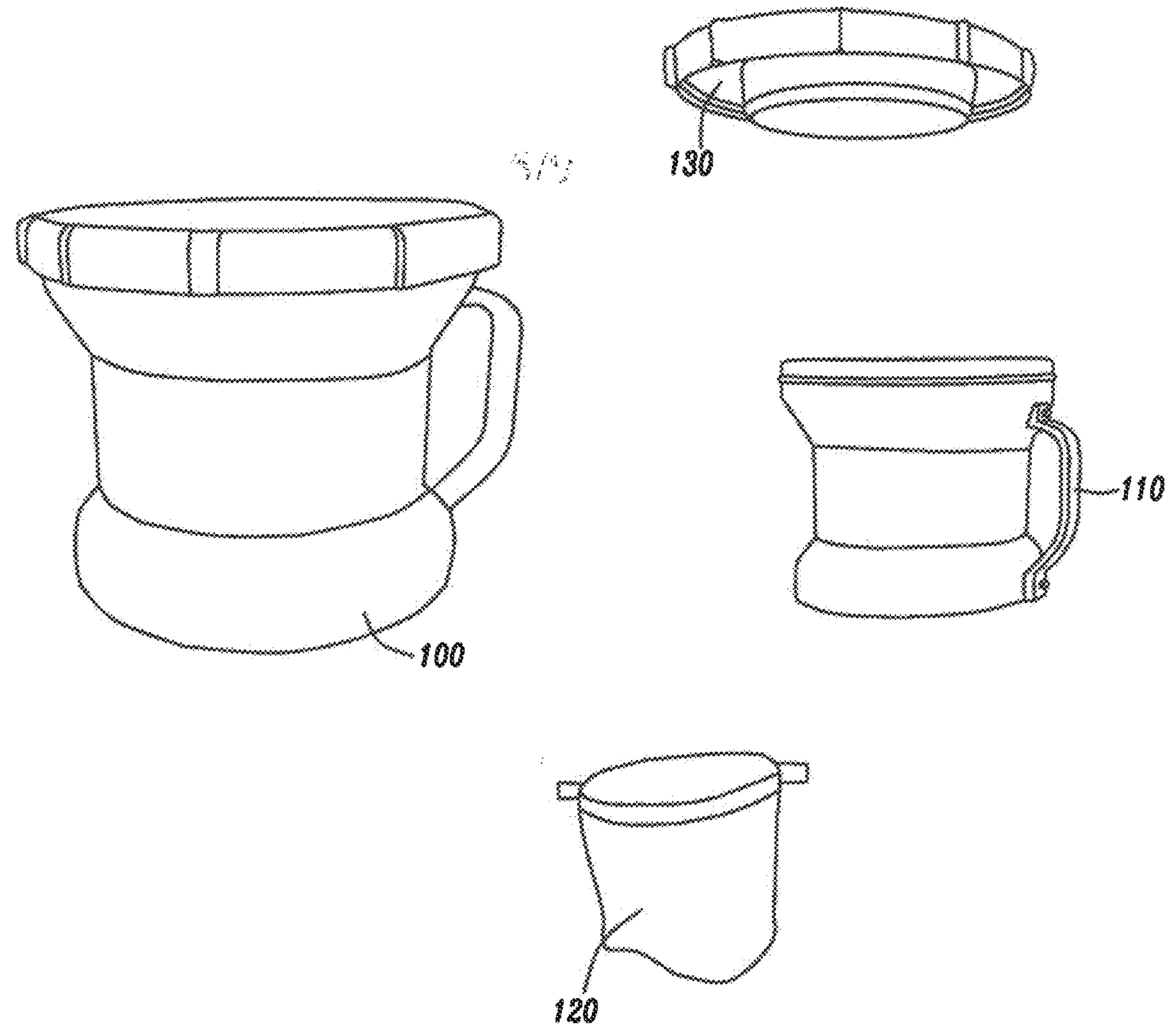
FIG. 3A shows the container, lid, mug with handle, and disposable bag separately and assembled, in a side view of the second preferred embodiment.

FIG. 3A shows the container 100, with its lid 130, handle 110, and bag 120 separately and assembled, in a side view of the second preferred embodiment. The bag is preferably made from natural fiber material making it biodegradable, allowing a consumer the option to compost the bag along with its contents.

Figure 3B:
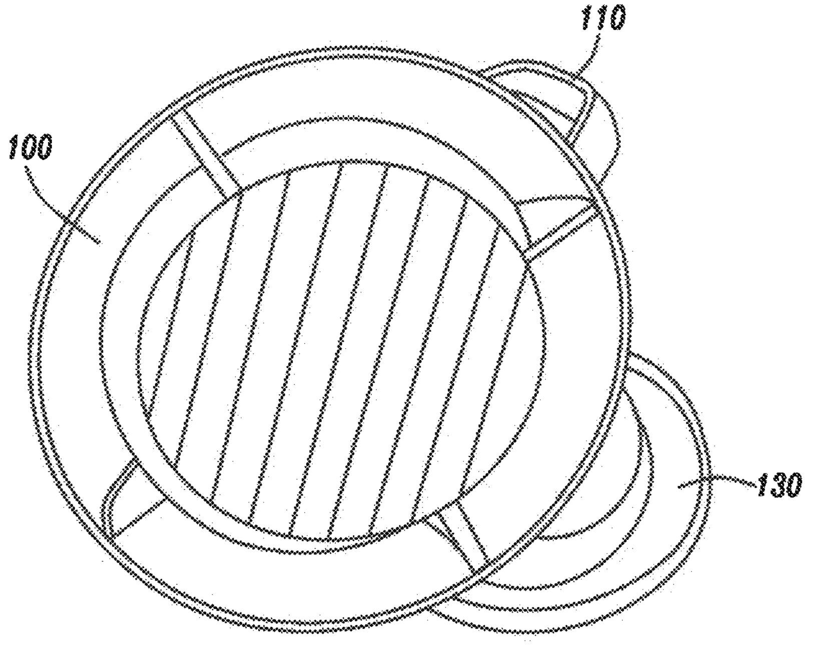
FIG. 3B illustrates a bottom view of the container, for the second preferred embodiment.

FIG. 3B illustrates a bottom view of container 100, in the second preferred embodiment.

Figure 4A:
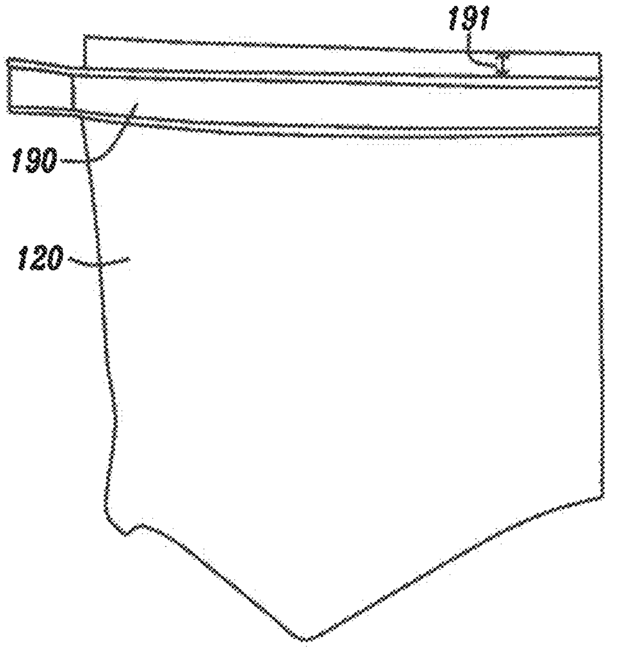
FIG. 4A shows a tin tie attached to the bag with an adhesive, in the second preferred embodiment.
Figure 4B:
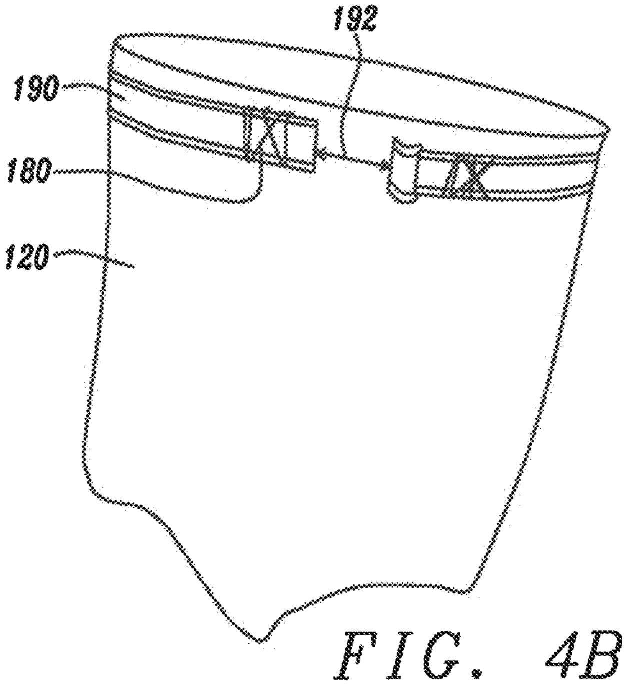
FIG. 4B illustrates the tin tie sewn onto the top of the bag for extra security, in the second preferred embodiment.

The bag may comprise a closing system of plastic tin ties, preferably about 5/32 inch by 7 inches in size, to allow for a secure sealing method. FIG. 4A shows tin tie 190 attached to bag 120 with an adhesive, at a height 191 of, for example, 5/64 inch from the top of the bag. FIG. 4B shows the tin tie sewn onto the top of bag with thread 180, for extra security. The tin tie may fold upon itself, leaving a space 192 of, for example, a little more than 25/64 inch.

Figure 4C:
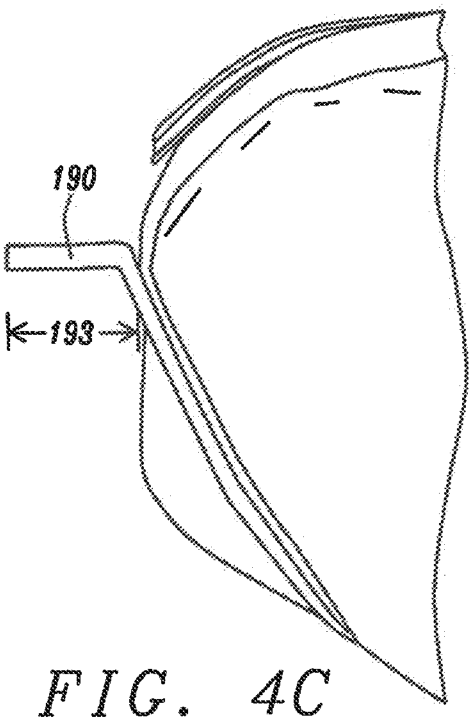
FIGS. 4C and 4D show the tin tie before and after being bent on itself, in the second preferred embodiment.
Figure 4D:
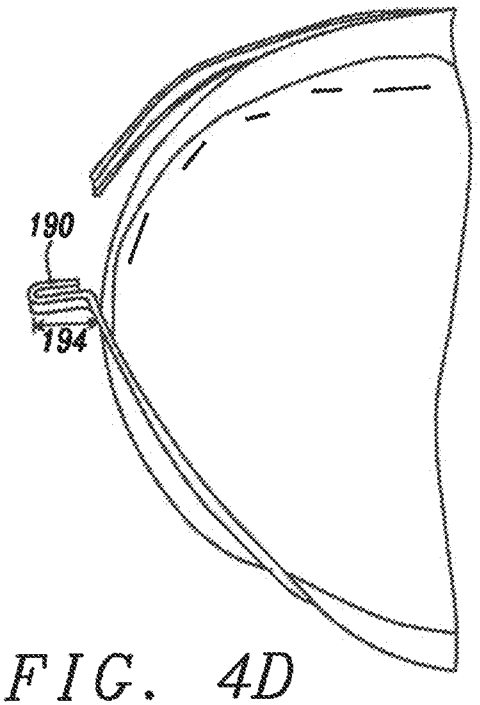

FIG. 4C shows the end of the tin tie before being bent on itself, at a length 193 of, for example, 3/4 inch. FIG. 4D shows the end of the tin tie after being bent on itself, at a length 194 of, for example, 3/8 inch. In this way, the tin tie may bend at the end to lock into position.

Figure 4E:
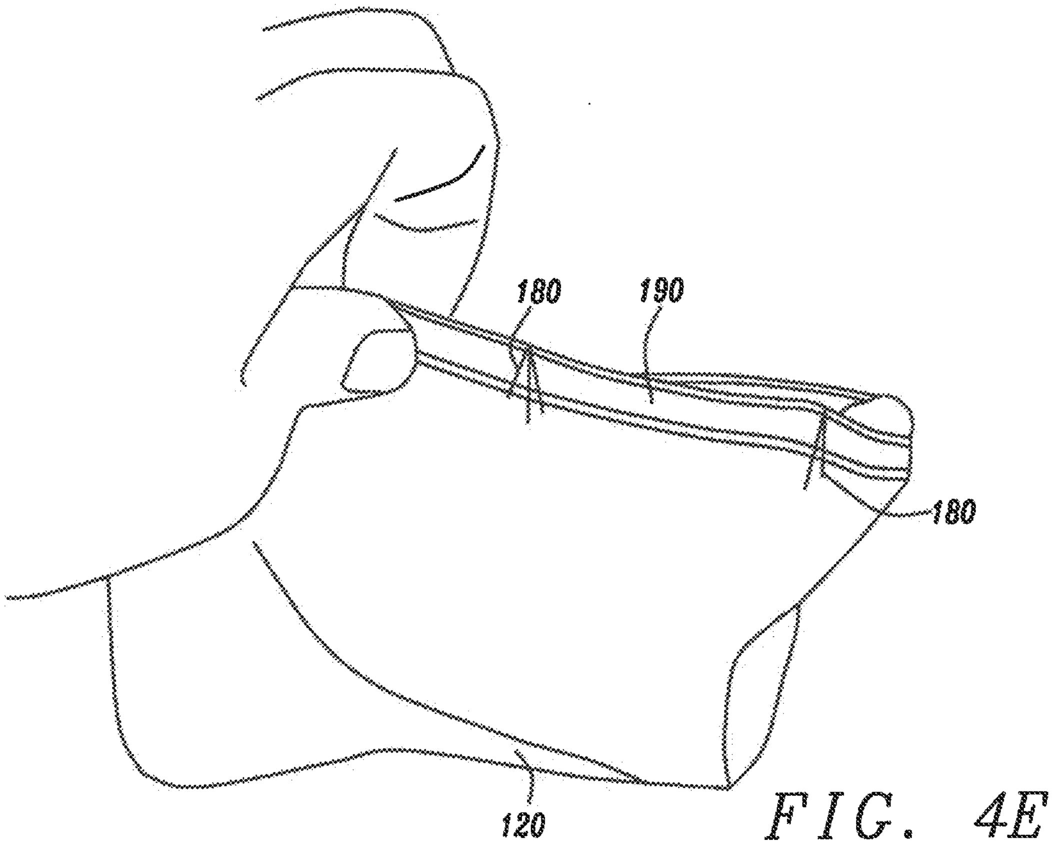
FIG. 4E illustrates how the tin tie is placed so that the consumer can fold the top of the bag over itself once filled, in the second preferred embodiment.

FIG. 4E illustrates how tin tie 190 is placed so that the consumer can fold the top of bag 120 over itself, and unwanted excess heating oil may be disposed of without spills. Also, the tin tie can easily be removed if the consumer wants to compost the bag without it.

Figure 5A:
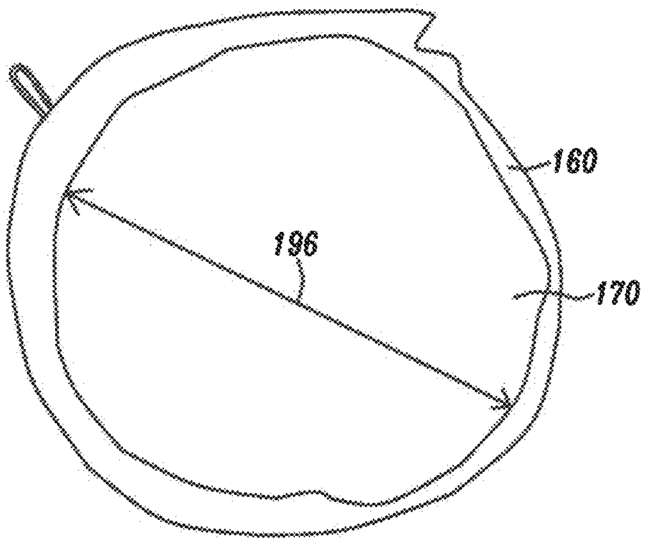
FIG. 5A shows the composition of the bag using a double layer of burlap and wax or parchment paper, in a top view of the second preferred embodiment.
Figure 5B:
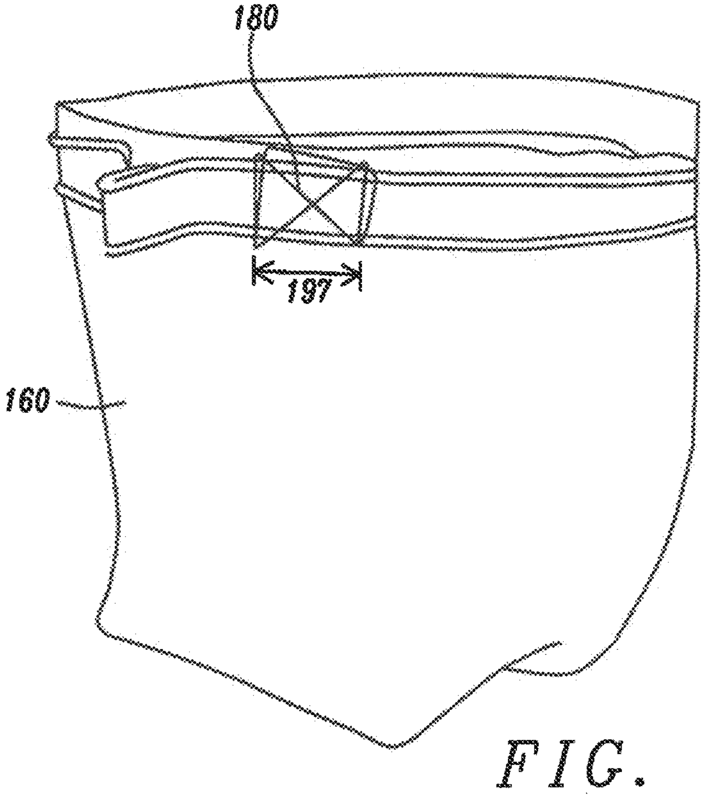
FIG. 5B illustrates the tin tie and the disposable burlap bag sewn together, in another view of the second preferred embodiment.

FIG. 5A shows the composition of the bag may be a double layer of burlap 160 and wax/parchment paper 170, in a top view. The dual layer prevents the contents inside the bag from spilling out or leaking through. The diameter 196 of the bag may be, for example, 4.25 inches across. FIG. 5B shows a disposable and compostable natural fiber bag, comprised of jute burlap lined with wax/parchment paper, sewn together with thread 180. The size of the stitch 197 may be, for example, 25/64 inch. The total height of the bag is preferably 4 23/32 inches, and other heights may be used.

The bag may typically store up to 16 oz of used edible oils, greases, and fats. The bag may be treated with a vinegar solution sprayed on the outside of the bag. The vinegar solution may comprise white vinegar and an essential oil, such as jasmine or other scents. This inhibits mold growth and helps to control odor. Advantages of the jute burlap or natural fibers include the burlap being a natural fiber, breathable, and able to withstand high temperatures needed for the used cooking oil. Mainly edible oils, such as greases and animal fats, are meant to be stored in the bag.

The plant-based solidifying blend may be in tablet or flake form, placed at the bottom of the bag. The solidifying agent may also comprise a paste or spray on material placed on the inner lining of the bag up to a height of, for example, 2.16 inches. The heat of the oil melts the tablet or paste and starts the solidifying process. The composition of the solidifying blend oversaturates the oils, greases, and fats with hydrogen, increasing their melting point, resulting in a material that is solid at room temperature. This makes the contents of the bag much more manageable to contain. The ingredients used in the tablet may, for example, comprise stearic acid and oleic acid in a 4:1 ratio, where the stearic acid acts as a solidifying agent for most edible oils, while still being food-grade for people of all religions and cultures.

Ratios for the solidifying agent may vary within limits, for example, 1 to 8 tablespoons of Stearic Acid, 1 to 8 tablespoons of Oleic Acid, and 1 to 4 tablespoons of Beeswax. Note that different ratios may affect the quality of the solidifying process.

The advantages of one or more embodiments of the present disclosure include providing a disposable bag inside which an oil solidifying blend is placed. The bag is housed in a secure container and made from environmentally friendly materials. The container is made from 100% recycled plastic and is heat resistant. The container is flared for safety and covered with a lid. The device for storing used oil, grease, and fat is for anyone who cooks on a regular basis and provides for quick and easy cleanup. The disclosure prevents unsafe oil disposal, and protects from leaks, spills, and grease fires. The disclosure prevents oils, greases and fats from entering water bodies and forming a surface film in the water, blocking oxygen and sunlight, harming aquatic life.

While particular embodiments of the present disclosure have been illustrated and described, it will be understood by those skilled in the art that various changes in form and details may be made without departing from the spirit and scope of the invention.

What is claimed is:

1. A device for storing used oil, grease, and fat, comprising:

a disposable bag, into which used oil, grease, and fat is poured, wherein the bag is dual layered, made from jute burlap and wax/parchment paper stitched together with thread or attached with adhesive spray/gel or a non-toxic glue;

a container, comprising a lid and handle, and holding the disposable bag that fits inside the container; and a plant-based solidifying blend inside the disposable bag, wherein the plant-based solidifying blend causes the oil, grease, and fat to solidify after coming into contact with one another.

2. The bag of claim 1, wherein the jute burlap is biodegradable, allowing for composting the bag along with its contents, is breathable, and is able to withstand high temperatures.

3. The device of claim 1, wherein a tin tie is positioned at the top of the bag, configured to close the bag and to secure the bag contents.

4. The device of claim 3, wherein the container comprises two slots for the tin tie to rest in, and to hold the bag securely.

5. The tin tie of claim 3, where the tin tie is attached to the bag with an adhesive, or is sewn onto the top of bag.

6. The device of claim 1, wherein cloth drawstrings are positioned at the top of the bag, configured to close the bag and to secure the bag contents.

7. The device of claim 1, the bag exterior further comprising a coating of white vinegar and essential oil solution to inhibit mold and to control odor.

8. The device of claim 7, wherein the essential oil comprises jasmine.

9. The device of claim 1, wherein the plant-based solidifying blend comprises a paste.

10. The device of claim 1, wherein the plant-based solidifying blend comprises a tablet.

11. The device of claim 1, wherein the plant-based solidifying blend comprises flakes or spray on material.

12. The device of claim 1, wherein the plant-based solidifying blend comprises stearic acid and oleic acid, in a 4:1 ratio.

13. The device of claim 1, wherein the plant-based solidifying blend comprises 4 tablespoons of stearic acid, 2 tablespoons of oleic acid, and 1 tablespoon of beeswax.

14. The device of claim 1, wherein the container comprises heat resistant materials made from recycled PET plastic, or carbon.

15. The device of claim 1, wherein the container is flared at its top, to funnel liquids into the container.

16. The device of claim 1, wherein the lid is attachable to the top of the container via threads and includes an O-ring.

17. The device of claim 1, wherein the lid further comprises an extended bottom portion, that dips into the container when fully attached, to prevent spillage.

18. The device of claim 1, wherein the bag further comprises a bulb shape at its bottom, to help keep the bag in place in the container during use.

19. A device for storing used oil, grease, and fat, comprising:

a disposable bag, into which used oil, grease, and fat is poured, wherein the bag is dual layered, made from jute burlap and greaseproof paper stitched together with thread or attached with adhesive spray/gel or a non-toxic glue;

a container, comprising a lid and handle, and holding the disposable bag that fits inside the container; and a plant-based solidifying blend inside the disposable bag, wherein the plant-based solidifying agent comprises a paste, and wherein the plant-based solidifying blend causes the oil, grease, and fat to solidify after coming into contact with one another.

* * * * *